United States Patent [19]

Shimoi et al.

[11] 4,425,285

[45] Jan. 10, 1984

[54] PACKING MATERIAL UNIT

[75] Inventors: Yoichi Shimoi, Kamakura; Mikio Akune, Yokosuka; Tamotsu Akimoto, Urawa; Ryuzo Watanabe, Washinomiya, all of Japan

[73] Assignee: Nittetu Chemical Engineering Ltd., Tokyo, Japan

[21] Appl. No.: 428,376

[22] Filed: Sep. 29, 1982

[30] Foreign Application Priority Data

Feb. 26, 1982 [JP] Japan .............................. 57-25808[U]

[51] Int. Cl.³ ................................................ B01F 3/04
[52] U.S. Cl. ........................................ 261/95; D23/4; 55/90; 55/233; 202/158; 261/DIG. 72; 422/211
[58] Field of Search ...................... 261/94–98, 261/DIG. 72; 210/150, 151; 55/90, 233; 202/158; D23/4; 422/211, 310

[56] References Cited

U.S. PATENT DOCUMENTS

| | | | |
|---|---|---|---|
| 2,867,425 | 1/1959 | Teller | 261/95 |
| 3,506,248 | 4/1970 | Starbuck et al. | 261/94 |
| 3,752,453 | 8/1973 | Doyne | 261/94 |
| 3,914,351 | 10/1975 | McKeown et al. | 261/98 |
| 4,067,936 | 1/1978 | Ellis et al. | 261/98 |
| 4,072,736 | 2/1978 | Fattinger | 261/97 |
| 4,122,011 | 10/1978 | Strigle, Jr. | 210/150 |
| 4,203,935 | 5/1980 | Hackenjos | 55/90 X |
| 4,275,019 | 6/1981 | Bednarski | 261/98 |
| 4,385,988 | 5/1983 | Hypponen | 202/158 X |

FOREIGN PATENT DOCUMENTS

| | | | |
|---|---|---|---|
| 2313287 | 9/1974 | Fed. Rep. of Germany | 261/DIG. 72 |
| 1439745 | 6/1976 | United Kingdom | 261/DIG. 72 |
| 523705 | 1/1977 | U.S.S.R. | 261/DIG. 72 |
| 567479 | 8/1977 | U.S.S.R. | 261/DIG. 72 |

Primary Examiner—Richard L. Chiesa
Attorney, Agent, or Firm—Stephen F. K. Yee

[57] ABSTRACT

A packing material unit for use in liquid-gas contact apparatuses, which comprises outer and inner rings, and a plurality of pairs of arched filaments positioned side by side such that their curved outer surfaces are oriented alternately to opposite sides of the plane involving the outer and inner rings to form a plurality of circular or elliptic loops arranged about an imaginary circle which is concentric with the outer and inner rings. A connecting member is bridged between intermediate portions of each pair of the filament. A plural number of reinforcing members extend between apex portions of oppositely arched filaments of adjacent filament pairs. The connecting members and reinforcing members serve both to prevent the interlocking of adjacent packing material units and to improve mechanical strength of the unit.

2 Claims, 7 Drawing Figures

PACKING MATERIAL UNIT

BACKGROUND OF THE INVENTION

1. Field of the Invention:

This invention relates to packing material units for use in liquid-gas contact apparatuses.

2. Description of the Prior Art:

It has been the general practice to employ packing units of a synthetic polymeric material as packing material for washing towers, absorption towers or distilling towers because of its superior corrosion resistance and low prices. Examples of such packing material units include a filamentous packing unit disclosed in U.S. Pat. No. 2,867,425 as shown in FIG. 6 of the accompanying drawing (hereinafter referred to as "unit A") and a similar filamentous packing unit disclosed in U.S. Pat. No. 3,752,453 as shown in FIG. 7 (hereinafter referred to as "unit B").

In designing the packing material for the mass transfer process between liquid and gas phases, the following properties are usually taken into consideration as general criteria.

(1) Large surface area per unit volume;
(2) Large free volume permitting, with a minimized resistance, the passage of liquid and gas flows through the tower;
(3) High mechanical strength;
(4) Small amount of resin per unit volume; and
(5) Feasibility of injection molding.

The above-mentioned packing units A and B almost satisfy these requirements. From an economical point of view, however, it is still desired to reduce the number of packing units required to fill a unit volume, which is as large as 32,500/m$^3$ in the case of unit A and 25,000/m$^3$ in the case of unit B. Less packing units are required per unit packed space in the case of the unit B since it is provided with an outer ring which serves to reduce the amount of interlocking with adjacent units.

The reduction in the number of the packing units, however, normally leads to a reduction in surface area per unit volume, bringing about an undesired reduction in the interfacial area per unit contactor volume which is an important factor in the mass transfer between liquid and gas phases. Moreover, providing a further interlock-preventing member to reduce the number of packing units per unit packed space causes an increase in amount of the synthetic polymeric material and, if the thickness of the filaments is reduced to avoid this problem, the resulting packing units are then lowered in strength. Thus, the reduction of the filling number, i.e. the increase of the bulk volume, which is desirable from an economic point of view, has not been sought for in view of the impairment of other properties.

SUMMARY OF THE INVENTION

It is, therefore, an object of the present invention to provide an economical packing material unit for use in a mass transfer process. It is another object of the present invention to provide a packing material unit which permits a reduction in the filling number without entailing a drop in mechanical strength or an increase in amount of the polymeric material and which can be produced by injection molding.

BRIEF DESCRIPTION OF THE DRAWINGS

Other objects, features and advantages of the invention will become apparent from the detailed description of the preferred embodiments of the invention, when considered in light of the accompanying drawings, in which.

DESCRIPTION OF THE PREFERRED EMBODIMENTS

Figure 1:
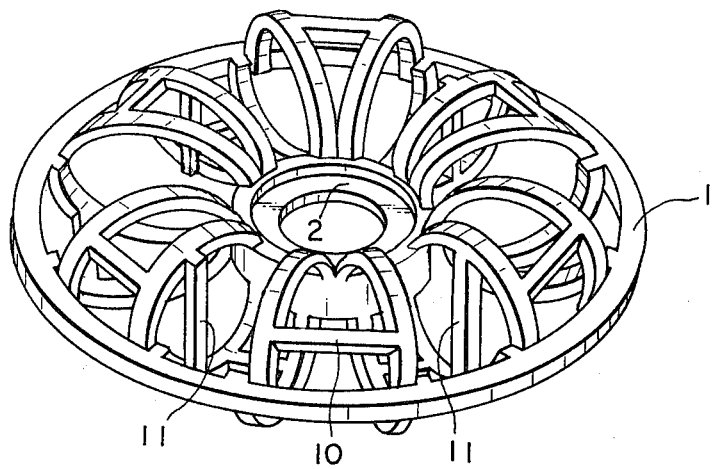
FIG. 1 is a perspective view diagrammatically showing a packing material unit according to the present invention.
Figure 2:
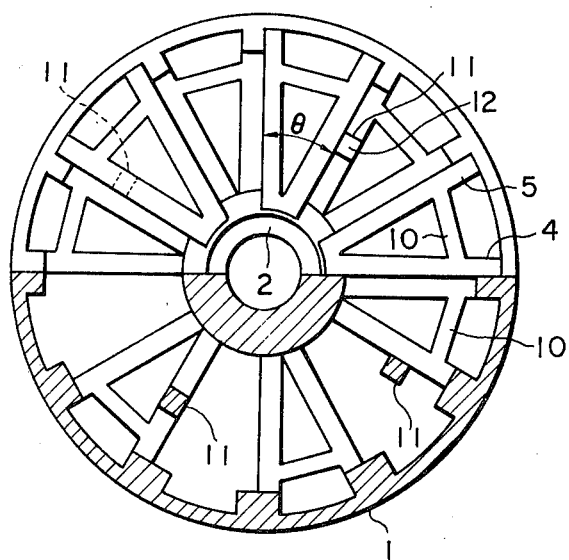
FIG. 2 is a plan view, partly in cross-section, of the packing material unit of FIG. 1.
Figure 3:
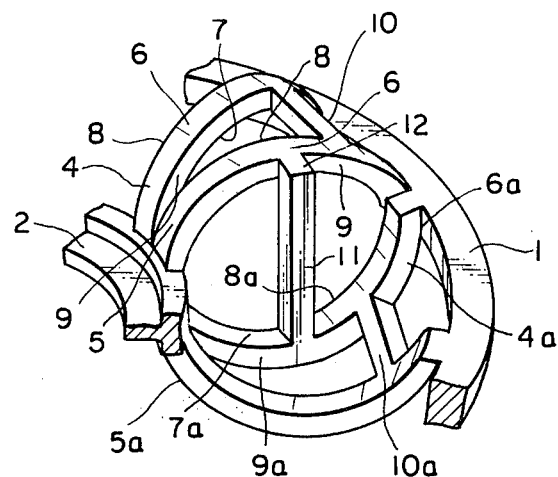
FIG. 3 is a fragmentary enlarged perspective view of the same packing unit.

Referring to FIGS. 1 to 3, the packing material unit according to the present invention is provided with an outer, generally circular ring 1 which has substantially a square or rectangular shape in section, and an inner, generally circular ring 2 which is positioned generally coaxially, preferably concentrically, with the outer ring 1. Bridged between the outer and inner rings 1 and 2 are a plural number of radially extending paired filament members 4 and 5. Each of the filament members 4 and 5 is substantially square or rectangular in section, with inner and outer surfaces 7 and 6 and opposite side surfaces 8 and 9. In the particular embodiment shown, each one of the filament members 4 and 5 has one end portion fixed to the outer ring with the outer surface 6 being in contact with the inner periphery of the outer ring 1, and the other end portion fixed to the inner ring 2 with the outer surface 6 being in contact with the outer periphery of the inner ring 1. The manner of fixing the filaments 4 and 5 to the inner and outer rings 2 and 1 is not limited to the form just described. For example, the opposite end faces of the respective filaments may be fixed to the inner and outer rings if desired.

As shown particularly in FIG. 2, each pair of filaments 4 and 5 are oriented to form an angle of $\theta$ between the side surface 8 of the filament 4 and the side surface 9 of the filament 5. Extending between intermediate portions of each pair of filaments 4 and 5 is a connecting member 10 which serves to enhance the mechanical strength of the packing unit and to prevent interlocking with other packing units. The connecting member 10 normally has a square or rectangular shape in section. Although the connecting member 10 may be protruded beyond the outer surfaces 6 of the filaments 4 and 5, it is preferable to provide it in flush with the outer surfaces 6 of the filaments as shown in the drawings in order to minimize attrition caused by occasional vibration during operation and to ease handling for charging or discharging of the packing units.

A plural number of pairs of filaments 4 and 5, each linked by the connecting member 10, are positioned side by side such that their curved outer surfaces are oriented alternately to opposite sides of the plane involving the outer and inner rings 1 and 2 to form a plurality of circular or elliptic loops arranged about an imaginary circle which is concentric with the outer and inner rings 1 and 2. More specifically, as shown in FIG. 3, a pair of filaments 4a and 5a which are located adjacent to a pair of upwardly curved filaments 4 and 5 have the respective outer surfaces 6a disposed downward, with the side surface 9 of the filament 5 being in contact with the opposing side surface 8a of the filament 4a. Therefore, the adjacent filaments 5 and 4a jointly form a loop. If the packing material unit has an n-number of pairs of filaments, there is established the relationship of $n\theta = 360°$ in which $\theta$ is the angle formed by the filaments of each pair as mentioned hereinbefore. The respective paired filaments may be arranged at different angles ($\theta_1, \theta_2, \ldots \theta_n$), and in that case they are in the relationship of $\theta_1 + \theta_2 \ldots \theta_n = 360°$. However, no special merit is obtained from the use of filament pairs of different angles.

The packing unit of the invention is further provided with a plural number (four in the particular embodiment shown) of reinforcing members 11, each extending between apex portions of opposing filaments of adjacent filament pairs. As best seen from FIG. 3, one end (or end face) of the each reinforcing member 11 is abuttingly connected to the inner surface of the apex portion of the filament 4a. The other end of the reinforcing member 11 is connected to the opposing filament 5 in the bulged apex portion thereof with the side surface of the reinforcing member being in contact with the side surface 9 of the filament 5. The reinforcing members 11 serve to further increase the strength of the packing material unit and at the same time to prevent interlocking of individual packing units. The number of the reinforcing members is preferred to be greater than four and to be provided at angularly equidistant positions about the axis of the packing unit. It is also preferred that the reinforcing members 11 are arranged so that the exposed end faces 12 of the reinforcing members 11 are present in the same number and at uniform angular intervals in the upper and lower sides of the unit so as to have the most effective interlocking-preventing structure.

The packing material unit can be produced by way of injection molding and respective parts which constitute the packing material unit are, thus, formed from the same synthetic polymeric material such as polyethylene, polypropylene, polyvinyl chloride, chlorinated polyvinyl chloride, nylon, fluororesins, polystyrene and the like.

The packing material unit construction of the present invention, which employs the connecting members 10 and reinforcing members 11, prevents interlocking of the individual units. Therefore, less packing units are required for filling a unit packing space. In addition, the filament portions can be formed in a reduced thickness (sectional area) owing to the increase of mechanical strength of the unit by the provision of the connecting and reinforcing members, permitting to cut the amount of the polymeric material to an extent which is greater than the amount required for the connecting and reinforcing members. However, the reduction of the filling number will invite a reduction in the surface area of the packing unit per unit volume, consequently reducing the interfacial area per unit contactor volume. Therefore, if the mass velocity of each of gas and liquid is constant, there occurs an increase in the height of an overall gas-phase mass transfer unit $H_{OG}$. This may appear disadvantageous in view of the relationship that $Z = H_{OG} \times N_{OG}$, where Z is the height of the packed section and $N_{OG}$ is the number of overall gas-phase mass transfer units. But, the reduction in the number of packing units makes it possible to increase the mass velocity of the gas because of the reduction of the pressure drop in the gas flows. Since the mass velocity of the liquid can also be increased, it becomes possible to increase the above-mentioned interfacial area to some extent, which contributes to the reduction of $H_{OG}$. If the flow rate is constant, the increase of these mass velocities permits the reduction of the sectional area of a tower, namely, the reduction of the diameter of a tower, which is desirable from the standpoint of reducing the packing volume. As a consequence, with the packing units of the present invention, the mass velocity can be increased to such an extent that the increase in the volume of a packed section can be avoided in spite of some increase in the height of the packed section. Therefore, the packing material unit of the present invention can achieve a given mass transfer process at a lower cost as compared with the conventional packing units A and B.

EXAMPLE

Figure 4:
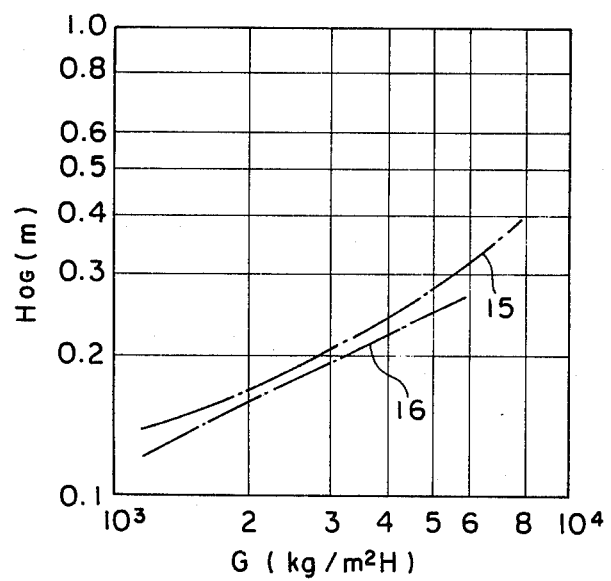
FIGS. 4 and 5 are graphic representations of the relationship between the gas velocity in the tower and the height of an overall gas-phase mass-transfer unit and the relationship between the gas flow velocity G and the pressure drop, respectively.
Figure 5:
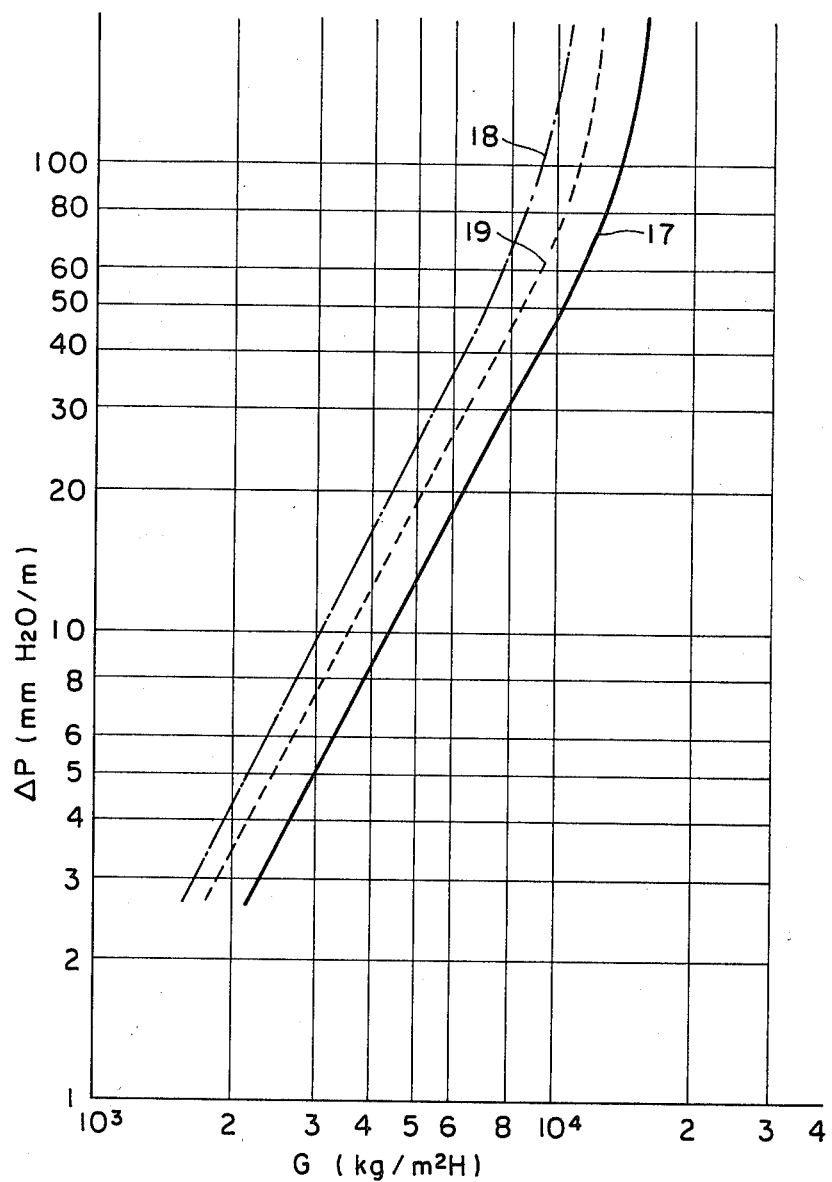
Figure 6:
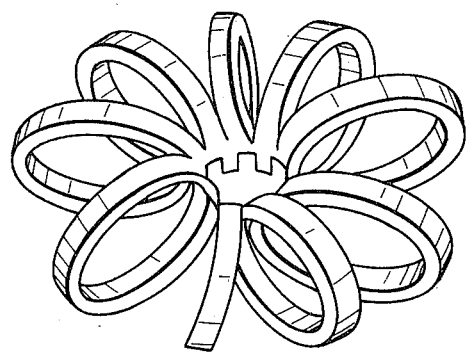
FIGS. 6 and 7 are perspective views of conventional packing units.
Figure 7:
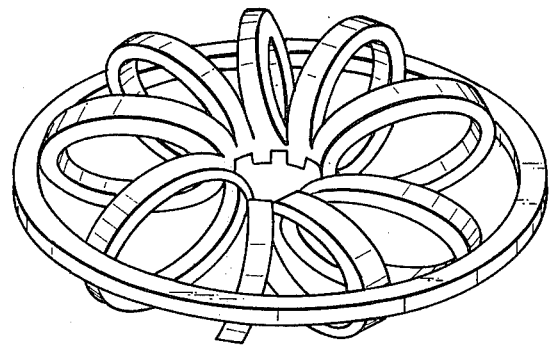

Ammonia-containing air (1.2 kg/m³ in density) is contacted with water for absorption of ammonia in a tower packed with packing material units of this invention, packing material units A, or units B, having the same gross volume. The air feed rate is 50,000 kg/h. The process is conducted with the number of overall gas-phase mass transfer units $N_{OG}$ of 4.8 under conditions involving the liquid flow velocity L through the tower being 20,000 and the pressure drop $\Delta P$ being 20 mmH$_2$O/m. The numbers, weights and surfaces areas of the respective packing material units are as shown in Table 1. The graphs of FIGS. 4 and 5 show the relationship between the gas flow velocity G and the height of overall gas-phase mass transfer unit and the relationship between G and the pressure drop $\Delta P$, respectively. In FIG. 4, the curve 15 is for the packing material unit of this invention while the curve 16 is for the units A and B. In FIG. 5, the curves 17, 18 and 19 are respectively for the unit of this invention, unit A and unit B. In the case of the packing material according to the present invention, the value of G at the pressure drop of 20 mmH$_2$O/m is 6400 kg/m²H as seen from the curve 17 in FIG. 5 and therefore the sectional area A of the packed section is 7.8 m (50,000/6400 m²). Thus, the tower diameter D is 3.15 m. Further, as seen from the curve 15 in FIG. 4, the value of $H_{OG}$ at G=6,400 is 0.33 m, so that the height of the packed section is $Z = N_{OG} \times H_{OG} = 4.8 \times 0.33 = 1.58$ m and the packed volume is $V = D \times Z = 12.32$ m³. Since the required number of packing units per unit volume is 18,500, it is necessary to use 227,920 (18,500×12.32) units in total in order to satisfy the condition of the process. The corresponding values of the units A and B, obtained by similar calculations, are also shown in Table 1.

TABLE 1

|  | Unit A | Unit B | Unit of Invention |
|---|---|---|---|
| Number of required per unit volume (m³) | 32500 | 25000 | 18500 |
| Weight per unit volume (kg/m³) (polypropylene) | 119 | 120 | 70 |
| Surface area (m²/m³) | 185 | 180 | 143 |
| Tower diameter D (m) | 3.15 | 3.75 | 3.50 |
| Packed height (m) | 1.58 | 1.13 | 1.20 |
| Packed volume (m³) | 12.32 | 12.54 | 11.52 |
| Number of units | 227920 | 407550 | 288000 |

The economical values of the conventional units A and B and the unit of the invention, which have no material difference in the manufacturing cost per unit, are regarded as being proportional to the number of packed units. As clear from the results shown in Table 1, the packing unit of the present invention permits the mass transfer process to proceed economically in a comparably advantageous manner in spite of the reduced surface area per unit volume. A higher mechanical strength and a prolonged service life of the packing material unit of this invention as compared with the conventional units, further improve its economical value.

What is claimed is:

1. A packing material unit for use in a liquid-gas contact apparatus, comprising:
   concentrically disposed outer and inner rings;
   a plural number of paired filaments radially bridged between said outer and inner rings, said pairs of filaments being arched alternately on opposite sides of a plane involving said outer and inner rings;
   a connecting member extending between intermediate portions of each pair of said filaments; and
   a plural number of reinforcing members extending between apex portions of oppositely arched filaments of adjacent filament pairs.

2. A packing material unit as set forth in claim 1, wherein said outer and inner rings, said reinforcing members and said filament members have a square or rectangular shape in section.

* * * * *